(12) United States Patent
Sugahara et al.

(10) Patent No.: US 10,369,666 B2
(45) Date of Patent: Aug. 6, 2019

(54) STAINLESS STEEL FLUX-CORED WIRE

(75) Inventors: Hiroshi Sugahara, Fujisawa (JP);
Tetsunao Ikeda, Fujisawa (JP);
Hirohisa Watanabe, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 2347 days.

(21) Appl. No.: 13/342,461

(22) Filed: Jan. 3, 2012

(65) Prior Publication Data
US 2012/0223064 A1 Sep. 6, 2012

(30) Foreign Application Priority Data
Mar. 1, 2011 (JP) ................... 2011-043648

(51) Int. Cl.
*B23K 35/22* (2006.01)
*B23K 35/02* (2006.01)
(Continued)

(52) U.S. Cl.
CPC ........ *B23K 35/0266* (2013.01); *B23K 35/308* (2013.01); *B23K 35/3601* (2013.01); *B23K 35/362* (2013.01)

(58) Field of Classification Search
CPC ...... C23C 4/06; B22F 5/12; B22F 7/08; B22F 2999/00; B22F 2207/01; B23K 35/0266;
(Continued)

(56) References Cited

U.S. PATENT DOCUMENTS 3,418,179 A * 12/1968 Raynes .............. B23K 35/0244
148/24
3,453,721 A * 7/1969 Jayne .................. B23K 35/302
148/24
(Continued)

FOREIGN PATENT DOCUMENTS

EP 1361016 A1 11/2003
EP 2 361 719 A1 8/2011
(Continued)

OTHER PUBLICATIONS

The Extended European Search Report dated Apr. 18, 2012, in European Application No. / Patent No. 12000432.0-1215.
(Continued)

*Primary Examiner* — Eric S Stapleton
(74) *Attorney, Agent, or Firm* — Oblon, McClelland, Maier & Neustadt, L.L.P.

(57) ABSTRACT

It is an object to provide a stainless steel flux-cored wire in which the amount of hexavalent chromium in fume can be reduced while maintaining the weldability excellent. The stainless steel flux-cored wire contains, as percentage to the total mass of the wire: Cr: 11-30 mass %; metal Si, Si oxide and Si compound: 0.5-4.0 mass % in total in terms of Si [Si]; fluorine compound: 0.01-1.0 mass % in terms of F [F]; $TiO_2$: 1.5 mass % or above; $ZrO_2+Al_2O_3$: 3.2 mass % or below; Na compound, K compound and Li compound: 0.50 mass % or below in total of each of an amount in terms of Na [Na], an amount in terms of K [K] and an amount in terms of Li [Li]; and satisfies $\{([Na]+[K]+[Li])\times[Cr]^2\}/([Si]+4.7\times[F])\leq 10$, where [Cr] represents Cr content.

9 Claims, 1 Drawing Sheet

(51) Int. Cl.
*B23K 35/30* (2006.01)
*B23K 35/36* (2006.01)
*B23K 35/362* (2006.01)

(58) Field of Classification Search
CPC .. B23K 35/22; B23K 35/304; B23K 35/0261; B23K 35/3033; B23K 35/3616; B23K 35/3605; B23K 35/3607; B23K 35/3608; B23K 35/3066; C22C 1/023; C22C 19/03; C22C 19/055; C22F 1/10
USPC .................................................. 219/145.22
See application file for complete search history.

(56) References Cited

U.S. PATENT DOCUMENTS

| | | | | |
|---|---|---|---|---|
| 3,511,960 A * | 5/1970 | De Haeck | B23K 9/035 | 219/137 R |
| 3,986,899 A * | 10/1976 | Kole | B23K 35/302 | 148/23 |
| 4,017,339 A * | 4/1977 | Okuda | B23K 35/362 | 148/24 |
| 4,323,756 A * | 4/1982 | Brown | B22F 3/006 | 219/121.66 |
| 5,580,475 A * | 12/1996 | Sakai | B23K 35/0266 | 219/145.22 |
| 5,861,605 A * | 1/1999 | Ogawa | B23K 35/368 | 219/145.22 |
| 5,914,061 A * | 6/1999 | Ogawa | B23K 35/3086 | 219/145.22 |
| 6,124,569 A * | 9/2000 | Bonnet | B23K 35/3073 | 148/22 |
| 6,140,607 A * | 10/2000 | Kamada | B23K 35/368 | 148/24 |
| 6,340,396 B1 * | 1/2002 | Ogawa | B23K 35/308 | 148/23 |
| 6,417,105 B1 * | 7/2002 | Shah | B22F 3/23 | 257/E21.169 |
| 6,713,391 B2 * | 3/2004 | Yi | B22F 3/23 | 257/E21.169 |
| 6,830,822 B2 * | 12/2004 | Yadav | A61L 27/06 | 423/326 |
| 6,849,109 B2 * | 2/2005 | Yadav | A61L 27/06 | 106/286.2 |
| 6,863,851 B2 * | 3/2005 | Josephy | C09D 5/36 | 264/1.1 |
| 6,916,872 B2 * | 7/2005 | Yadav | B01J 12/005 | 524/404 |
| 6,967,183 B2 * | 11/2005 | Hampden-Smith | B01J 2/003 | 428/570 |
| 7,005,212 B2 * | 2/2006 | Sakai | C01B 3/0052 | 420/900 |
| 7,138,159 B2 * | 11/2006 | Hampden-Smith | B01J 2/003 | 257/E23.075 |
| 7,211,345 B2 * | 5/2007 | Hampden-Smith | B01J 2/003 | 257/E23.075 |
| 7,279,222 B2 * | 10/2007 | Hearley | B22F 1/0018 | 420/900 |
| 7,300,720 B2 * | 11/2007 | Sakai | C01B 3/0052 | 420/900 |
| 7,364,628 B2 * | 4/2008 | Kakimoto | B01J 3/08 | 148/101 |
| 7,491,910 B2 * | 2/2009 | Kapoor | B23K 35/0261 | 219/145.1 |
| 7,501,207 B2 * | 3/2009 | Sakai | C01B 3/0052 | 420/900 |
| 7,700,237 B2 * | 4/2010 | Kihara | C22C 19/03 | 420/900 |
| 7,713,350 B2 * | 5/2010 | Yadav | A61L 27/06 | 106/401 |
| 7,718,710 B2 * | 5/2010 | Zhang | B01J 13/0034 | 502/150 |
| 7,776,383 B2 * | 8/2010 | Yadav | A61L 27/06 | 427/164 |
| 7,816,006 B2 * | 10/2010 | Yadav | A61L 27/06 | 428/402 |
| 7,820,088 B2 * | 10/2010 | Josephy | C09D 5/36 | 264/1.1 |
| 7,932,311 B2 * | 4/2011 | Aymonier | B01J 23/44 | 524/186 |
| 8,044,324 B2 * | 10/2011 | Suzuki | B23K 35/0261 | 219/145.1 |
| 8,052,743 B2 * | 11/2011 | Weber | A61F 2/82 | 424/426 |
| 8,153,934 B2 * | 4/2012 | Kapoor | B23K 9/0216 | 219/137 WM |
| 8,153,935 B2 * | 4/2012 | Jang | B23K 35/0266 | 219/145.22 |
| 8,330,078 B2 * | 12/2012 | Gerth | B23K 35/0244 | 219/145.1 |
| 8,372,734 B2 * | 2/2013 | Van Duren | B22F 1/0055 | 427/64 |
| 8,492,679 B2 * | 7/2013 | Sugahara | B23K 35/0266 | 156/325 |
| 8,623,448 B2 * | 1/2014 | Robinson | B22F 1/0055 | 427/74 |
| 8,841,375 B2 * | 9/2014 | Peri | B22F 9/24 | 420/501 |
| 2002/0003135 A1 * | 1/2002 | Goto | B23K 35/0266 | 219/145.22 |
| 2002/0022160 A1 * | 2/2002 | Schmidt | B01D 53/326 | 429/5 |
| 2002/0041047 A1 * | 4/2002 | Josephy | C09D 5/36 | 264/81 |
| 2002/0064949 A1 * | 5/2002 | Shah | B22F 3/23 | 438/682 |
| 2002/0074067 A1 * | 6/2002 | Ota | C21D 8/0205 | 148/610 |
| 2002/0102849 A1 * | 8/2002 | Yi | B22F 3/23 | 438/682 |
| 2002/0107140 A1 * | 8/2002 | Hampden-Smith | B01J 2/003 | 502/185 |
| 2002/0139454 A1 * | 10/2002 | Komori | C21D 6/04 | 148/578 |
| 2002/0155019 A1 * | 10/2002 | Ota | C22C 38/002 | 420/112 |
| 2002/0160248 A1 * | 10/2002 | Takao | C22C 38/004 | 429/492 |
| 2002/0165407 A1 * | 11/2002 | Nakahara | B01D 3/225 | 562/546 |
| 2002/0197505 A1 * | 12/2002 | Shigekuni | C23C 22/10 | 428/648 |
| 2003/0008504 A1 * | 1/2003 | Miyazaki | C01D 1/28 | 438/689 |
| 2003/0018380 A1 * | 1/2003 | Craig | A61L 31/022 | 623/1.15 |
| 2003/0064265 A1 * | 4/2003 | Hampden-Smith | B01J 2/003 | 429/483 |
| 2003/0094217 A1 * | 5/2003 | Yazawa | C21D 8/0405 | 148/325 |
| 2003/0094444 A1 * | 5/2003 | Kato | B23K 35/368 | 219/145.22 |
| 2003/0096164 A1 * | 5/2003 | Sakai | C01B 3/0052 | 429/206 |
| 2003/0118884 A1 * | 6/2003 | Hampden-Smith | B01J 2/003 | 429/480 |
| 2003/0130114 A1 * | 7/2003 | Hampden-Smith | B01J 2/003 | 502/180 |
| 2003/0188813 A1 * | 10/2003 | Hirasawa | C22C 38/001 | 148/609 |
| 2003/0196997 A1 * | 10/2003 | Watanabe | B23K 35/368 | 219/145.22 |
| 2003/0207112 A1 * | 11/2003 | Yadav | A61L 27/06 | 428/402 |
| 2003/0207978 A1 * | 11/2003 | Yadav | B01J 12/005 | 524/435 |
| 2003/0209293 A1 * | 11/2003 | Sako | C23C 22/34 | 148/273 |

(56) References Cited

U.S. PATENT DOCUMENTS

| | | | |
|---|---|---|---|
| 2003/0209521 A1* | 11/2003 | Tucker | C23C 22/56 216/83 |
| 2003/0212179 A1* | 11/2003 | Yadav | B01J 12/005 524/435 |
| 2003/0233912 A1* | 12/2003 | Sugitatsu | C21B 13/0046 75/324 |
| 2004/0020912 A1* | 2/2004 | Hara | B23K 35/3053 219/145.22 |
| 2004/0065171 A1* | 4/2004 | Hearley | B22F 1/0018 75/255 |
| 2004/0094236 A1* | 5/2004 | Maurer | C23C 22/62 148/252 |
| 2004/0139888 A1* | 7/2004 | Yadav | B01J 12/005 106/403 |
| 2004/0149357 A1* | 8/2004 | Kakimoto | B01J 3/08 148/301 |
| 2004/0157068 A1* | 8/2004 | Torii | C08L 81/02 428/473.5 |
| 2004/0170820 A1* | 9/2004 | Yadav | A61L 27/06 428/323 |
| 2004/0180203 A1* | 9/2004 | Yadav | A61L 27/06 428/402 |
| 2004/0213998 A1* | 10/2004 | Hearley | B22F 1/0018 428/402 |
| 2005/0147832 A1* | 7/2005 | Okai | C08G 59/4035 428/447 |
| 2005/0189337 A1* | 9/2005 | Baune | B23K 35/365 219/145.23 |
| 2005/0205525 A1* | 9/2005 | Barhorst | B23K 9/173 219/74 |
| 2005/0271542 A1* | 12/2005 | Frankel | B23K 35/004 420/457 |
| 2005/0282033 A1* | 12/2005 | Nakamaru | C23C 2/26 428/623 |
| 2006/0037680 A1* | 2/2006 | Yamakoshi | C23C 14/3414 148/675 |
| 2006/0068080 A1* | 3/2006 | Yadav | A61L 27/06 427/8 |
| 2006/0081579 A1* | 4/2006 | Kotecki | B23K 35/0266 219/145.22 |
| 2006/0096966 A1* | 5/2006 | Munz | B23K 35/0266 219/145.22 |
| 2006/0144836 A1* | 7/2006 | Karogal | B23K 35/3605 219/146.1 |
| 2006/0147369 A1* | 7/2006 | Bi | B01J 4/002 423/594.17 |
| 2006/0150770 A1* | 7/2006 | Freim, III | B22F 1/025 75/343 |
| 2006/0182988 A1* | 8/2006 | Yamaji | C09D 5/10 428/629 |
| 2006/0219684 A1* | 10/2006 | Katiyar | B23K 35/3607 219/145.22 |
| 2006/0219685 A1* | 10/2006 | Karogal | B23K 35/30 219/145.22 |
| 2006/0243719 A1* | 11/2006 | Inoue | B23K 35/26 219/146.41 |
| 2006/0254678 A1* | 11/2006 | Sakai | C01B 3/0052 148/426 |
| 2006/0272746 A1* | 12/2006 | Kapoor | B23K 35/36 148/23 |
| 2007/0015012 A1* | 1/2007 | Bujard | A61K 8/19 428/845.1 |
| 2007/0158001 A1* | 7/2007 | Kihara | C22C 19/03 148/429 |
| 2007/0163679 A1* | 7/2007 | Fujisawa | C22C 38/001 148/325 |
| 2007/0190417 A1* | 8/2007 | Sakai | C01B 3/0052 429/218.2 |
| 2007/0219083 A1* | 9/2007 | Zhang | B01J 13/0034 502/150 |
| 2007/0259264 A1* | 11/2007 | Sakai | C01B 3/0052 429/218.2 |
| 2007/0272900 A1* | 11/2007 | Yoshida | C23C 22/34 252/387 |
| 2008/0017283 A1* | 1/2008 | Maruta | C22C 38/00 148/579 |
| 2008/0057341 A1* | 3/2008 | Bouillot | B23K 9/025 428/685 |
| 2008/0093352 A1* | 4/2008 | Jang | B23K 35/0266 219/145.22 |
| 2008/0099455 A1* | 5/2008 | Matsushita | B23K 35/3053 219/145.22 |
| 2008/0113257 A1* | 5/2008 | Hampden-Smith | B01J 2/003 429/482 |
| 2008/0121277 A1* | 5/2008 | Robinson | B22F 1/0055 136/256 |
| 2008/0128399 A1* | 6/2008 | Suzuki | B23K 35/3053 219/146.23 |
| 2008/0131479 A1* | 6/2008 | Weber | A61F 2/82 424/426 |
| 2008/0156228 A1* | 7/2008 | Yadav | A61L 27/06 106/404 |
| 2009/0017328 A1* | 1/2009 | Katoh | B23K 9/173 428/653 |
| 2009/0093597 A1* | 4/2009 | Aymonier | B01J 23/44 525/475 |
| 2009/0107550 A1* | 4/2009 | Van Duren | B22F 1/0055 136/262 |
| 2009/0158889 A1* | 6/2009 | Kodama | B23K 35/3086 75/302 |
| 2009/0242536 A1* | 10/2009 | Nagashima | B23K 35/0266 219/145.22 |
| 2009/0261085 A1* | 10/2009 | Suzuki | B23K 9/173 219/137 PS |
| 2009/0274926 A1* | 11/2009 | Okai | C09D 5/084 428/626 |
| 2010/0261827 A1* | 10/2010 | Peri | B22F 9/24 524/440 |
| 2010/0263485 A1* | 10/2010 | Poulalion | C21C 7/0056 75/304 |
| 2010/0276396 A1* | 11/2010 | Cooper | B08B 15/04 219/74 |
| 2011/0062133 A1* | 3/2011 | Inoue | B23K 35/3053 219/145.22 |
| 2011/0073570 A1* | 3/2011 | Shimura | B23K 9/173 219/74 |
| 2011/0114606 A1* | 5/2011 | Suzuki | B23K 35/0266 219/74 |
| 2011/0139761 A1* | 6/2011 | Sugahara | B23K 35/0266 219/145.22 |
| 2011/0143044 A1* | 6/2011 | Bujard | A61K 8/19 427/488 |
| 2011/0180523 A1* | 7/2011 | Ikeda | B23K 35/0266 219/145.22 |

FOREIGN PATENT DOCUMENTS

| | | |
|---|---|---|
| JP | 8-267282 | 10/1996 |
| JP | 2003-320480 | 11/2003 |
| JP | 2007-50452 | 3/2007 |
| JP | 2009-154183 | 7/2009 |

OTHER PUBLICATIONS

Japanese Notification of Reason(s) for Refusal dated Mar. 12, 2013, in Japan Patent Application No. 2011-043648 (with English translation).

* cited by examiner

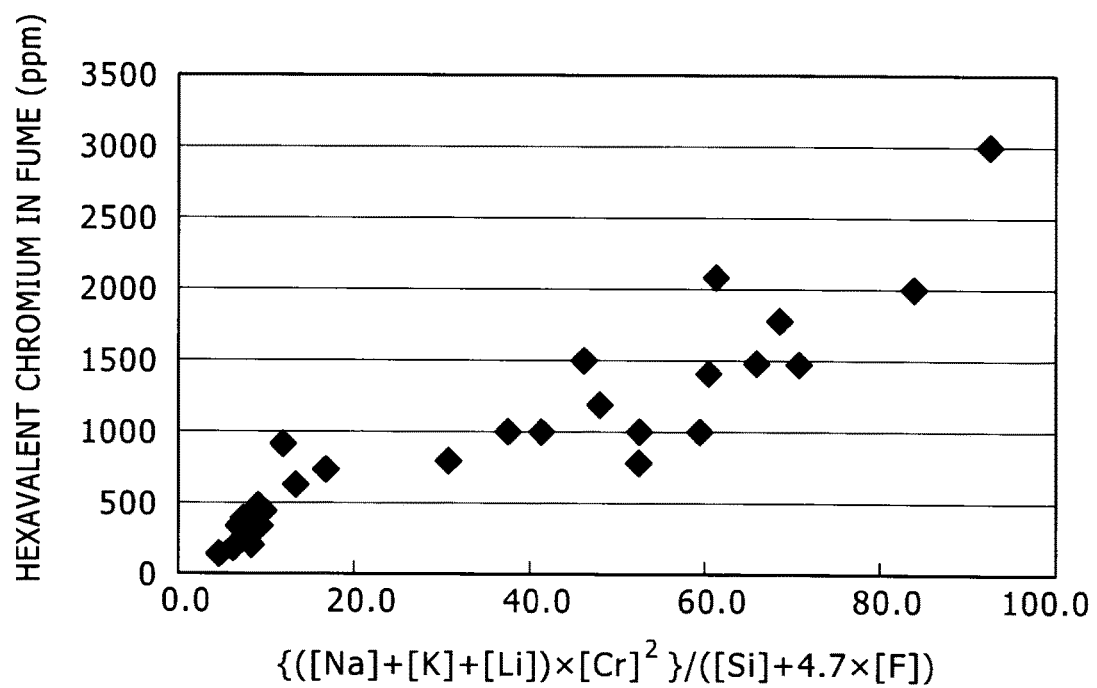

STAINLESS STEEL FLUX-CORED WIRE

BACKGROUND OF THE INVENTION

1. Field of the Invention

The present invention relates to a stainless steel flux-cored wire for arc welding filled up with flux in an outer sheath made of stainless steel, and relates specifically to a stainless steel flux-cored wire suppressing the amount of hexavalent chromium included in fume generated in welding stainless steel.

2. Description of the Related Art

In general, in slag and fume generated in welding stainless steel, Cr is included by 10 mass % or more, and when the slag and fume are dumped to soil and the like as they are and left for a long period of time, there is a problem that Cr may possibly be eluted into the soil and the like as hexavalent chromium ($Cr^{6+}$).

Recently, the concern over the industrial waste is increasing year by year as one of the environmental problems, and the permissible value of the hexavalent chromium amount in the ordinance issued by the Prime Minister's Office of Japan stipulating the criteria in relation with the industrial waste including metal and the like (Ordinance No. 5 issued on Feb. 17, 1973; as amended thereafter) is stipulated to be 1.5 ppm or below in land-fill disposal, and 0.5 ppm or below in a waste water treatment. Also, hexavalent chromium is reported to be a substance causing the damage of respiratory organs due to inhalation exposure and having carcinogenicity, and is extremely harmful to a human body. Therefore, in order to prevent elution of hexavalent chromium, prior arts described below have been proposed as the flux-cored wires for welding stainless steel.

In Japanese Published Unexamined Patent Application No. 2003-320480, a flux-cored wire is disclosed which contains Si: 1.0-4.0 mass % and Cr: 16-30 mass %, and Si/(Ti+Zr) is 0.8 or above and $(Na+K) \times Cr^2$ is 50 or below.

In Japanese Published Unexamined Patent Application No. 2007-50452, it is disclosed that elution of Cr can be suppressed when the Mn content in an elution test liquid produced by mixing fume generated when stainless steel is welded using a flux-cored wire for welding stainless steel with distilled water of the mass of 100 times of the mass of the fume is 70-220 mass ppm, and pH of the elution test liquid is 5.8-7.8.

In Japanese Published Unexamined Patent Application No. 2009-154183, a wire for welding stainless steel is disclosed which, in order to suppress elution of hexavalent chromium from slag, contains Cr: 12-32 mass %, N: 0.005-0.06 mass %, Ca: 0.01 mass % or below, Na: 0.01-0.5 mass %, K: 0.01-0.5 mass %, Na+K: 0.01-0.5 mass %. Also, in this document, it is disclosed that the wire is annealed by hydrogen gas in the manufacturing process of the wire.

However, in the fume generated in welding stainless steel, Cr is included by a great amount, and a part of Cr in the fume is present as hexavalent chromium ($Cr^{6+}$). In recent years, the harmful effect of hexavalent chromium has been re-evaluated and its restriction value has been made stricter. For example, the Occupational Safety & Health Administration (OSHA), United States Department of Labor made the permissible exposure limit (PEL) of hexavalent chromium stricter in 2006 from 52 µg/m³ to 5 µg/m³, or about ¹⁄₁₀ of the conventional value, which came into effect in June 2010. In response to it, as a method that can analyze hexavalent chromium more sensitively, a method combined with the hexavalent chromium extracting ion chromatograph and the post column color developing method was developed, and became an international standard as ISO 16740:2005. According to this analytical method for hexavalent chromium, an alkaline solution is adopted for hexavalent chromium extraction of the pre-treatment, and hexavalent chromium can be extracted more stably. In the flux-cored wires for welding stainless steel described in Japanese Published Unexamined Patent Application No. 2003-320480 and Japanese Published Unexamined Patent Application No. 2007-50452, hexavalent chromium in fume is analyzed by the diphenyl carbazide absorption method after extraction treatment by distilled water, however when the analytical method of ISO 16740:2005 is employed, even when the composition is in the range described above, there is a case that sufficient hexavalent chromium reduction effect cannot be secured. Further, because the weldability also has not reached a practical level, these flux-cored wires have not been practically used.

Also, the flux-cored wire for welding stainless steel described in Japanese Published Unexamined Patent Application No. 2009-154183 aims to reduce hexavalent chromium in slag, and has a problem that it is not effective in reducing hexavalent chromium in fume.

SUMMARY OF THE INVENTION

The present invention has been developed in view of such problems and its object is to provide a stainless steel flux-cored wire capable of reducing the amount of hexavalent chromium in fume compared with conventional cases even when an analytical method in accordance with ISO 16740:2005 is employed while maintaining excellent weldability.

The stainless steel flux-cored wire in relation with the present invention is a flux-cored wire for arc welding filled up with flux in an outer sheath made of stainless steel containing, as percentage to the total mass of the wire:

Cr: 11-30 mass %;

metal Si, Si oxide and Si compound: 0.5-4.0 mass % in total in terms of Si [Si];

fluorine compound: 0.01-1.0 mass % in terms of F [F];

$TiO_2$: 1.5 mass % or above;

$ZrO_2+Al_2O_3$: 3.2 mass % or below;

Na compound, K compound and Li compound: 0.50 mass % or below in total of each of an amount in terms of Na [Na], an amount in terms of K [K] and an amount in terms of Li [Li]; in which, $$\{([Na]+[K]+[Li]) \times [Cr]^2\}/([Si]+4.7 \times [F]) \leq 10$$

is satisfied where [Cr] represents Cr content.

Here, the amount in terms of each element means an amount converted to the content of the mass which only the element occupies when a content of a compound is to be calculated.

According to the present invention, the amount of hexavalent chromium in fume can be reduced while maintaining the weldability excellent. Also, because the flux-cored wire according to the present invention contains $Tio_2$: 1.5 mass % or above and $ZrO_2+Al_2O_3$: 3.2 mass % or below as percentage to the total mass of the wire, excellent arc stability and slag removability are maintained.

BRIEF DESCRIPTION OF THE DRAWING

FIG. 1 is a graph showing the relation between $\{([Na]+[K]+[Li]) \times [Cr]^2\}/([Si]+4.7 \times [F])$ and the amount of hexavalent chromium in fume.

DESCRIPTION OF THE PREFERRED EMBODIMENTS

Below, the present invention will be described in detail. The flux-cored wire has spread to wide fields because it has excellent weldability and high performance. Particularly in the welding material for stainless steel, the use ratio of the flux-cored wire is high. However, in the fume generated in welding using a conventional flux-cored wire for welding stainless steel, Cr is contained by 10 mass % or above, and a part of the Cr is present in the form of hexavalent chromium.

With respect to hexavalent chromium in working environment, its harmful effect to the human body has been questioned, and there has been a strong movement to strengthen the restriction of hexavalent chromium in working environment. For example, the Occupational Safety & Health Administration (OSHA), United States Department of Labor made the permissible exposure limit (PEL) of hexavalent chromium stricter in 2006 from 50 μg/m$^3$ to 5 μg/m$^3$, or 1/20 of the conventional value. Therefore, although it has been required to reduce hexavalent chromium in welding fume, the weldability is poor according to prior arts, and no technology has been established for practical use.

According to the present invention, a stainless steel flux-cored wire has been developed which reduced hexavalent chromium in fume while maintaining excellent weldability.

Next, the reason for adding an element and the reason for limiting the composition of the flux-cored wire in the present invention will be described.

[Cr: 11-30 Mass %]

When Cr content which is an indispensable element for stainless steel is below 11 mass %, a passive film is not formed and the corrosion resistance required for the weld metal as a welding wire for welding stainless steel is not exerted. Also, when the Cr amount exceeds 30 mass %, the Cr content in fume becomes extremely high, thereby the content of hexavalent chromium increases, and hexavalent chromium is not reduced sufficiently. Accordingly, Cr content is to be 11-30 mass %.

[Si: 0.5-4.0 Mass %]

In order to reduce elution of hexavalent chromium from fume, amorphization of fume is effective. Also, addition of Si is effective for amorphization of fume. Therefore, in order to reduce elution of hexavalent chromium, Si is added in the form of metal Si, Si oxide and/or Si compound. When the amount of these metal Si, Si oxide and Si compound is 0.5 mass % or above in total of respective amounts in terms of Si, the effect of amorphization can be secured. However, when the total of the amounts in terms of Si exceeds 4.0 mass %, the removability of slag deteriorates. Therefore, the amount to be added of these metal Si, Si oxide and Si compound is to be 0.5-4.0 mass % in total of respective amounts in terms of Si, preferably 1.0-4.0 mass %. As additive raw materials of Si, the metal Si included in the outer sheath, the metal Si, silica sand, feldspar, potassium fluoride and the like in the added raw material of the flux can be cited. All these raw materials are effective in increasing $SiO_2$ in fume, and the effect of reducing hexavalent chromium can be secured in any of these adding raw materials.

[Na Compound, K Compound and Li Compound: 0.50 Mass % or Below in Total of Each of an Amount in Terms of Na, an Amount in Terms of K and an Amount in Terms of Li]

Alkaline metals including Na, K and Li react with Cr in fume and form a hexavalent chromium compound soluble in water such as sodium chromate for example. Therefore, by increasing the alkaline metals in fume, the hexavalent chromium content in fume increases. Accordingly, the amount of the Na compound, K compound and Li compound is to be 0.50 mass % or below in total of each of an amount in terms of Na, an amount in terms of K and an amount in terms of Li. More preferable range of the amount of the Na compound, K compound and Li compound is 0.30 mass % or below in total of the amounts in terms of respective elements. Also, as the sources of Na, K and Li, oxides, fluorides and the like thereof can be cited.

[Fluorine Compound: 0.01-1.0 Mass % in Terms of F]

As a result of intensive experiments and studies, the present inventors found out that addition of a fluorine compound was effective in reducing hexavalent chromium in fume. In fume, fluorine reacts with alkaline metals, and forms alkaline metal fluoride. Therefore, by adding fluorine, an effect of suppressing the alkaline metals from reacting with chromium and forming a hexavalent chromium compound is secured. Unless the content of the fluorine compound in terms of F is 0.01 mass % or above, the effect of reducing hexavalent chromium cannot be secured, the pit resistance deteriorates, and the weldability deteriorates. On the other hand, when the fluorine compound is added exceeding 1.0 mass %, the weldability deteriorates. Therefore, the fluorine compound is to be 0.01-1.0 mass % in terms of F, and more preferably 0.01-0.80 mass %.

$[\{([Na]+[K]+[Li])\times[Cr]^2\}/([Si]+4.7\times[F])\leq 10]$

When [Cr] represents Cr content, [Si] represents an amount in terms of Si, [F] represents an amount in terms of F, [Na] represents an amount in terms of Na, [K] represents an amount in terms of K, and [Li] represents an amount in terms of Li, a parameter expressed by $\{([Na]+[K]+[Li])\times[Cr]^2\}/([Si]+4.7\times[F])$ is to be 10 or below. As a result of intensive experiments and studies, the present inventors found out that there was a strong correlation between the parameter and the hexavalent chromium amount in fume. Also, by making the parameter 10 or below, hexavalent chromium in fume can be greatly reduced in both cases that the shield gas is 100% $CO_2$ and a gas mixture (80% Ar-20% $CO_2$).

In the parameter, the elements appearing in the dominator are factors contributing more to reducing hexavalent chromium in fume when they are bigger, and the elements appearing in the numerator are factors contributing more to reducing hexavalent chromium in fume when they are smaller. The parameter is an indicator obtained by experimentally studying the balance of the two factors.

[$TiO_2$: 1.5 Mass % or above, $ZrO_2+Al_2O_3$: 3.2 Mass % or below]

When the amount to be added of alkaline metals is restricted as described above in order to suppress generation of hexavalent chromium, deterioration of the arc stability becomes a problem. $TiO_2$ has an effect of stabilizing an arc in addition to an effect of improving slag covering, and is effective in improving the arc stability when the alkaline metals are reduced. In order to secure these effects sufficiently, $TiO_2$ should be added by 1.5 mass % or above, preferably 2.0 mass % or above. Also, $TiO_2$ is to be 8.0 mass % or below. $ZrO_2$ and $Al_2O_3$ are preferable raw materials added as slag forming agents. For the purpose, it is preferable to add $ZrO_2$ and $Al_2O_3$ by 0.1 mass % or above in total. However, when $ZrO_2$ and $Al_2O_3$ are added too much, the slag removability is deteriorated, and therefore the amount to be added is to be 3.2 mass % or below in total, preferably 2.7 mass % or below. As the sources for $TiO_2$, rutile, ilminite, titanium oxide, potassium titanate and the like can be cited, and these raw materials are added solely or combining two kinds or more. As the sources for $ZrO_2$, zirconium sand, zirconium oxide and the like can be cited.

[Other Compositions]

As the other compositions, Ni, Mo, Mn and Fe are contained by 50-80 mass % in total. Not only that Ni, Mo, Mn and Fe are included in the outer sheath, they are added to the flux as metal powder. As the other oxides, $Al_2O_3$ and MgO can be cited.

EXAMPLES

Next, with respect to examples in relation with the present invention, their effects will be described in comparison with comparative examples that deviate from the scope of the present invention. Table 1 and Table 2 below illustrate the composition of the flux-cored wires of the examples and the comparative examples.

TABLE 1

| | | Shield gas | Chemical composition of wire (mass %) | | | | | |
|---|---|---|---|---|---|---|---|---|
| | | | Si | Na | K | Li | Na + K + Li | F |
| Example | 1 | 100%$CO_2$ | 1.9 | 0.03 | 0.02 | 0.00 | 0.05 | 0.02 |
| | 2 | 80%Ar—20%$CO_2$ | 3.8 | 0.03 | 0.02 | 0.00 | 0.05 | 0.02 |
| | 3 | 100%$CO_2$ | 0.6 | 0.02 | 0.05 | 0.00 | 0.07 | 0.45 |
| | 4 | 100%$CO_2$ | 3.9 | 0.45 | 0.02 | 0.00 | 0.47 | 0.92 |
| | 5 | 100%$CO_2$ | 3.8 | 0.02 | 0.46 | 0.00 | 0.48 | 0.97 |
| | 6 | 100%$CO_2$ | 3.8 | 0.02 | 0.02 | 0.44 | 0.48 | 0.95 |
| | 7 | 100%$CO_2$ | 2.3 | 0.08 | 0.02 | 0.00 | 0.10 | 0.90 |
| | 8 | 80%Ar—20%$CO_2$ | 2.4 | 0.02 | 0.00 | 0.01 | 0.03 | 0.02 |
| | 9 | 100%$CO_2$ | 3.3 | 0.02 | 0.05 | 0.00 | 0.07 | 0.95 |
| | 10 | 100%$CO_2$ | 1.9 | 0.03 | 0.02 | 0.00 | 0.05 | 0.02 |
| Comparative example | 1 | 100%$CO_2$ | 0.4 | 0.10 | 0.02 | 0.00 | 0.12 | 0.48 |
| | 2 | 100%$CO_2$ | 4.1 | 0.05 | 0.07 | 0.04 | 0.16 | 0.84 |
| | 3 | 80%Ar—20%$CO_2$ | 2.0 | 0.52 | 0.00 | 0.00 | 0.52 | 0.90 |
| | 4 | 100%$CO_2$ | 1.9 | 0.00 | 0.56 | 0.00 | 0.56 | 0.25 |
| | 5 | 100%$CO_2$ | 3.7 | 0.00 | 0.00 | 0.53 | 0.53 | 0.10 |
| | 6 | 100%$CO_2$ | 3.0 | 0.32 | 0.17 | 0.07 | 0.56 | 0.50 |
| | 7 | 80%Ar—20%$CO_2$ | 2.2 | 0.04 | 0.02 | 0.02 | 0.08 | 0.00 |
| | 8 | 100%$CO_2$ | 2.8 | 0.11 | 0.05 | 0.00 | 0.16 | 1.05 |
| | 9 | 80%Ar—20%$CO_2$ | 1.8 | 0.25 | 0.19 | 0 | 0.44 | 0.6 |
| | 10 | 100%$CO_2$ | 1.8 | 0.02 | 0 | 0.03 | 0.05 | 0.4 |
| | 11 | 100%$CO_2$ | 1.5 | 0.02 | 0 | 0.03 | 0.05 | 0.4 |
| | 12 | 100%$CO_2$ | 1.9 | 0.03 | 0.02 | 0.00 | 0.05 | 0.02 |
| | 13 | 100%$CO_2$ | 1.5 | 0.15 | 0.10 | 0.00 | 0.25 | 0.04 |
| | 14 | 100%$CO_2$ | 1.8 | 0.16 | 0.10 | 0.00 | 0.26 | 0.06 |
| | 15 | 100%$CO_2$ | 1.5 | 0.15 | 0.10 | 0.00 | 0.25 | 0.04 |
| | 16 | 100%$CO_2$ | 1.5 | 0.15 | 0.10 | 0.00 | 0.25 | 0.04 |
| | 17 | 100%$CO_2$ | 1.5 | 0.08 | 0.06 | 0.00 | 0.14 | 0.04 |
| | 18 | 100%$CO_2$ | 1.2 | 0.08 | 0.10 | 0.01 | 0.19 | 0.08 |
| | 19 | 100%$CO_2$ | 1.4 | 0.20 | 0.14 | 0.00 | 0.34 | 0.08 |
| | 20 | 100%$CO_2$ | 1.3 | 0.13 | 0.01 | 0.11 | 0.25 | 0.05 |
| | 21 | 100%$CO_2$ | 1.7 | 0.10 | 0.10 | 0.00 | 0.20 | 0.09 |
| | 22 | 100%$CO_2$ | 1.1 | 0.11 | 0.29 | 0.00 | 0.40 | 0.18 |
| | 23 | 100%$CO_2$ | 1.1 | 0.10 | 0.27 | 0.00 | 0.37 | 0.18 |

TABLE 2

| | | Cr | $TiO_2$ | $ZrO_2$ + $Al_2O_3$ | (Na + K + Li) × $Cr^2$/ (Si + 4.7 × F) | Ni | Mo |
|---|---|---|---|---|---|---|---|
| Example | 1 | 19 | 5.5 | 0.2 | 9.1 | 9.2 | 0.0 |
| | 2 | 19 | 2.0 | 0.2 | 4.6 | 9.1 | 0.0 |
| | 3 | 19 | 6.4 | 1.2 | 9.3 | 9.2 | 0.0 |
| | 4 | 12 | 2.5 | 1.4 | 8.2 | 0.0 | 0.0 |
| | 5 | 12 | 1.7 | 1.3 | 8.3 | 0.0 | 0.0 |
| | 6 | 12 | 2.1 | 1.2 | 8.4 | 0.0 | 0.0 |
| | 7 | 24 | 3.3 | 0.4 | 8.8 | 8.5 | 3.1 |
| | 8 | 22 | 1.6 | 0.1 | 5.8 | 12 | 0.0 |
| | 9 | 27 | 3.2 | 0.2 | 6.6 | 9 | 0.0 |
| | 10 | 18 | 2.1 | 3.4 | 8.1 | 12 | 2.1 |
| Comparative | 1 | 19 | 7.2 | 2.1 | 16.3 | 9 | 0.0 |
| | 2 | 22 | 1.8 | 0.8 | 9.6 | 12 | 0.0 |
| example | 3 | 24 | 4.4 | 2.0 | 48.1 | 8 | 3.0 |
| | 4 | 19 | 0.3 | 1.4 | 65.7 | 11 | 2.3 |
| | 5 | 22 | 4.3 | 2.2 | 61.5 | 12 | 2.2 |
| | 6 | 24 | 2.1 | 0.5 | 60.3 | 19 | 0.0 |
| | 7 | 19 | 1.5 | 3.3 | 13.1 | 9 | 0.0 |
| | 8 | 19 | 2.2 | 0.9 | 7.5 | 9 | 0.0 |
| | 9 | 22 | 3.5 | 3.6 | 46.1 | 9 | 0.0 |
| | 10 | 22 | 1.9 | 3.3 | 6.6 | 11 | 0.0 |
| | 11 | 22 | 1.4 | 3.0 | 7.7 | 9 | 0.0 |
| | 12 | 23 | 2.6 | 0.9 | 13.3 | 12 | 0.0 |
| | 13 | 19 | 1.2 | 2.4 | 53.5 | 9 | 0.0 |
| | 14 | 18 | 1.4 | 2.3 | 40.5 | 9 | 0.0 |
| | 15 | 19 | 1.2 | 2.4 | 53.5 | 12 | 0.0 |
| | 16 | 24 | 1.1 | 2.3 | 85.3 | 12 | 2.2 |
| | 17 | 19 | 1.3 | 2.6 | 29.9 | 9 | 0.0 |
| | 18 | 19 | 3.3 | 1.7 | 43.5 | 10 | 0.0 |
| | 19 | 19 | 4.2 | 1.8 | 69.1 | 9 | 0.0 |
| | 20 | 19 | 3.4 | 2.1 | 58.8 | 9 | 0.0 |
| | 21 | 20 | 5.1 | 1.2 | 37.7 | 9 | 0.0 |
| | 22 | 19 | 6.6 | 1.7 | 74.2 | 9 | 0.0 |
| | 23 | 22 | 6.5 | 1.8 | 92.0 | 12 | 0.0 |

Welding was performed using these welding wires, and fume was taken. The fume was taken by a method of performing welding for five minutes continuously in accordance with JIS Z 3930:2001 (Determination of emission rate of particulate fume in arc welding) and taking the fume generated during the welding by a filter. The welding condition was 200 A of the welding current and 30 V of the arc voltage. Also, from the welding fume taken, hexavalent chromium included therein was analyzed. The analytical method for hexavalent chromium in fume was in accordance with ISO 16740:2005. The analytical results of the hexavalent chromium and the weldability in welding are shown in Table 3 below.

(Method for Evaluating Weldability)

Using stainless steel of 304 type as a base metal, bead-on-plate welding was performed in the form of flat horizontal fillet welding. The welding condition was welding current: 190-210 A, arc voltage: 28-31 V in all cases.

(Criteria for Evaluating Weldability)

With respect to the arc stability, the stability of transfer of the molten droplet and the generated amount of the spatter were organoleptically evaluated. One that greatly generated coarse droplets transfer and the spatter was evaluated to be unstable in an arc. With respect to the slag removability, one in which the slag was naturally removed after welding without seizure of slag was determined to be excellent.

of the comparative examples 2, 8, 10 and 11. Also, in the comparative examples 2, 8, 10 and 11, the weldability was as poor as not reaching a practical level. In the comparative example 1, because Si was less, the value of the parameter did not satisfy the required range, and the amount of hexavalent chromium in fume became high. In the comparative example 2, because Si was too high, although the amount of hexavalent chromium became low, the slag removability deteriorated to a large extent. In the comparative examples 3 to 6, because the added amount of the alkaline metals was too much, the value of the parameter did not satisfy the required range, and the amount of hexavalent chromium became high. In the comparative example 7, because F was too low, the pit resistance deteriorated. In the comparative example 8, because F was too high, the amount of the spatter increased and the weldability deteriorated. In the comparative example 9, although the range of respective compositions was satisfied, the parameter did not satisfy the required range, and therefore the amount of hexavalent chromium became high. In the comparative example 10, because the added amount of $ZrO_2$ was too much, the slag removability deteriorated. In the comparative example 11, because the added amount of $TiO_2$ was less, the slag remov-

TABLE 3

| | | Hexavalent chromium in fume (ppm) | Fume generated amount (mg/min) | Evaluation of weldability | | |
|---|---|---|---|---|---|---|
| | | | | Arc stability | Slag removability | Others |
| Example | 1 | 300 | 393 | Good | Good | — |
| | 2 | 120 | 221 | Good | Good | — |
| | 3 | 310 | 381 | Good | Good | — |
| | 4 | 400 | 458 | Good | Good | — |
| | 5 | 350 | 442 | Good | Good | — |
| | 6 | 190 | 472 | Good | Good | — |
| | 7 | 470 | 427 | Good | Good | — |
| | 8 | 170 | 192 | Good | Good | — |
| | 9 | 210 | 430 | Good | Good | — |
| | 10 | 200 | 402 | Good | Good | — |
| Comparative example | 1 | 730 | 419 | Good | Good | — |
| | 2 | 430 | 439 | Good | Poor | — |
| | 3 | 1200 | 285 | Good | Good | — |
| | 4 | 1500 | 427 | Good | Good | — |
| | 5 | 2100 | 432 | Good | Good | — |
| | 6 | 1400 | 441 | Good | Good | — |
| | 7 | 620 | 387 | Good | Good | Pit generated |
| | 8 | 300 | 521 | Unstable arc | Good | — |
| | 9 | 1500 | 245 | Good | Good | — |
| | 10 | 320 | 399 | Good | Poor | — |
| | 11 | 380 | 404 | Unstable arc | Poor | — |
| | 12 | 900 | 417 | Good | Good | — |
| | 13 | 1000 | 442 | Good | Poor | — |
| | 14 | 1000 | 457 | Good | Poor | — |
| | 15 | 800 | 488 | Good | Poor | — |
| | 16 | 2000 | 469 | Good | Poor | — |
| | 17 | 780 | 436 | Good | Poor | — |
| | 18 | 1000 | 472 | Good | Good | — |
| | 19 | 1800 | 489 | Good | Good | — |
| | 20 | 1000 | 495 | Good | Good | — |
| | 21 | 1000 | 487 | Good | Good | — |
| | 22 | 1500 | 475 | Good | Good | — |
| | 23 | 3000 | 492 | Good | Good | — |

When the amount of hexavalent chromium in fume was 500 ppm or below, it was determined that there was an effect of reducing the amount of hexavalent chromium in fume. Further, the generated amount of the fume was also measured. As a result of it, in all of the examples 1 to 10 of the present invention, the amount of hexavalent chromium is 500 ppm or below, and it is known that the amount of hexavalent chromium can be reduced. On the other hand, in the cases of the comparative examples, the amount of hexavalent chromium exceeded 500 ppm with the exception ability and the arc stability deteriorated. In the comparative examples 12 to 23, because the parameter could not satisfy the required range, the amount of hexavalent chromium exceeded 500 ppm in all cases. Also, in all cases of the comparative examples 13 to 17, because the added amount of $TiO_2$ was 1.5 mass % or below, the slag removability deteriorated.

Next, the value of the parameter was changed. The result of the study on the influence of the parameter will be described below. Table 4 below shows the composition of the welding wire used. Also, the relation between the value of the parameter $\{([Na]+[K]+[Li]) \times [Cr]^2\}/([Si]+4.7\times[F])$ and the amount of hexavalent chromium in fume is shown in Table 5 below and FIG. 1.

TABLE 4

|  |  | Si | Na | K | Li | Na + K + Li | F | Cr |
|---|---|---|---|---|---|---|---|---|
| Example | 11 | 1.9 | 0.03 | 0.02 | 0.00 | 0.04 | 0.02 | 19.1 |
|  | 12 | 1.9 | 0.03 | 0.02 | 0.00 | 0.04 | 0.02 | 18.8 |
| Comparative example | 24 | 1.9 | 0.03 | 0.02 | 0.00 | 0.04 | 0.02 | 22.5 |
|  | 25 | 1.5 | 0.15 | 0.10 | 0.00 | 0.25 | 0.04 | 18.9 |
|  | 26 | 1.8 | 0.16 | 0.10 | 0.00 | 0.26 | 0.06 | 18.1 |
|  | 27 | 1.5 | 0.15 | 0.10 | 0.00 | 0.25 | 0.04 | 19.4 |
|  | 28 | 1.5 | 0.15 | 0.10 | 0.00 | 0.25 | 0.04 | 23.7 |
|  | 29 | 1.5 | 0.08 | 0.06 | 0.00 | 0.14 | 0.04 | 18.8 |
|  | 30 | 1.2 | 0.08 | 0.10 | 0.01 | 0.19 | 0.08 | 19.2 |
|  | 31 | 1.4 | 0.20 | 0.14 | 0.00 | 0.34 | 0.08 | 19.3 |
|  | 32 | 1.3 | 0.13 | 0.01 | 0.11 | 0.25 | 0.05 | 19.0 |
|  | 33 | 1.7 | 0.10 | 0.10 | 0.00 | 0.20 | 0.09 | 20.2 |

TABLE 5

|  |  | (Na + K + Li) × Cr²/ (Si + 4.7 × F) | Hexavalent chromium in fume (ppm) |
|---|---|---|---|
| Example | 11 | 8.1 | 300 |
|  | 12 | 7.7 | 200 |
| Comparative example | 24 | 11.2 | 900 |
|  | 25 | 52.0 | 1000 |
|  | 26 | 41.6 | 1000 |
|  | 27 | 54.8 | 800 |
|  | 28 | 81.8 | 2000 |
|  | 29 | 29.8 | 780 |
|  | 30 | 42.3 | 1000 |
|  | 31 | 70.9 | 1800 |
|  | 32 | 59.3 | 1000 |
|  | 33 | 38.1 | 1000 |

As shown in FIG. 1, when the relation between the parameter and hexavalent chromium satisfies the condition of $$\{([Na]+[K]+[Li]) \times [Cr]^2\}/([Si]+4.7\times[F]) \leq 10,$$

the amount of hexavalent chromium in fume becomes 500 ppm or below.

Accordingly, it is known that, according to the present invention, welding of stainless steel becomes possible in which the amount of hexavalent chromium in fume is low and the weldability is excellent.

What is claimed is:

1. A flux-cored wire for arc welding filled up with flux in an outer sheath made of stainless steel containing, as percentage to the total mass of the wire:
  Cr: 11-30 mass %;
  metal Si, Si oxide and Si compound: 1.1-4.0 mass % in total in terms of Si [Si];
  fluorine compound: 0.01-1.0 mass % in terms of F [F];
  TiO₂: 1.5 mass % or above;
  ZrO₂+Al₂O₃: 3.2 mass % or below;
  Na compound, K compound and Li compound: 0.50 mass % or below in total of each of an amount in terms of Na [Na], an amount in tell is of K [K] and an amount in terms of Li [Li]; wherein,
  when [Cr] represents Cr content (mass %), $\{([Na]+[K]+[Li])\times[Cr]^2\}/([Si]+4.7\times[F])\leq 10$ is satisfied.

2. The flux-cored wire for arc welding filled up with flux in an outer sheath made of stainless steel according to claim 1, wherein $\{([Na]+[K]+[Li])\times[Cr]^2\}/([Si]+4.7\times[F])\leq 9.3$ is satisfied.

3. The flux-cored wire for arc welding filled up with flux in an outer sheath made of stainless steel according to claim 1, wherein $\{([Na]+[K]+[Li])\times[Cr]^2\}/([Si]+4.7\times[F])\leq 9.1$ is satisfied.

4. The flux-cored wire for arc welding filled up with flux in an outer sheath made of stainless steel according to claim 1, wherein:
  Cr: 11-24 mass %.

5. The flux-cored wire for arc welding filled up with flux in an outer sheath made of stainless steel according to claim 1, wherein:
  Cr: 11-22 mass %.

6. A flux-cored wire for arc welding filled up with flux in an outer sheath made of stainless steel containing, as percentage to the total mass of the wire:
  Cr: 11-22 mass %;
  metal Si, Si oxide and Si compound: 0.5-4.0 mass % in total in terms of Si [Si];
  fluorine compound: 0.01-1.0 mass % in terms of F [F];
  TiO₂: 1.5 mass % or above;
  ZrO₂+Al₂O₃: 3.2 mass % or below;
  Na compound, K compound and Li compound: 0.50 mass % or below in total of each of an amount in terms of Na [Na], an amount in terms of K [K] and an amount in terms of Li [Li]; wherein, when [Cr] represents Cr content (mass %), $\{([Na]+[K]+[Li])\times[Cr]^2\}/([Si]+4.7\times[F])\leq 10$ is satisfied.

7. The flux-cored wire for arc welding filled up with flux in an outer sheath made of stainless steel according to claim 6, wherein
  $\{([Na]+[K]+[Li])\times[Cr]^2\}/([Si]+4.7\times[F])\leq 9.3$
  is satisfied.

8. The flux-cored wire for arc welding filled up with flux in an outer sheath made of stainless steel according to claim 6, wherein $\{([Na]+[K]+[Li])\times[Cr]^2\}/([Si]+4.7\times[F])\leq 9.1$ is satisfied.

9. The flux-cored wire for arc welding filled up with flux in an outer sheath made of stainless steel according to claim 6, wherein:
  metal Si, Si oxide and Si compound: 1.0-4.0 mass % in total in terms of Si [Si].

* * * * *